United States Patent [19]
Lewis

[11] Patent Number: 6,142,508
[45] Date of Patent: *Nov. 7, 2000

[54] SIDE IMPACT AIR BAG SYSTEM

[75] Inventor: Donald J. Lewis, Scottsdale, Ariz.

[73] Assignee: Universal Propulsion Company, Inc., Phoenix, Ariz.

[*] Notice: This patent issued on a continued prosecution application filed under 37 CFR 1.53(d), and is subject to the twenty year patent term provisions of 35 U.S.C. 154(a)(2).

[21] Appl. No.: 08/999,923

[22] Filed: Sep. 9, 1997

Related U.S. Application Data

[63] Continuation of application No. 08/664,973, Jun. 3, 1996, abandoned.

[51] Int. Cl.$^7$ .............................. B60R 21/22; B60R 21/26
[52] U.S. Cl. .................... 280/730.2; 280/737; 280/743.1
[58] Field of Search .............................. 280/730.2, 730.1, 280/737, 736, 740, 741, 742, 728.2, 743.1, 728.1

[56] References Cited

U.S. PATENT DOCUMENTS

| | | | |
|---|---|---|---|
| 3,721,456 | 3/1973 | McDonald | 280/736 |
| 3,756,621 | 9/1973 | Lewis et al. | 280/741 |
| 3,807,754 | 4/1974 | Rodenbach et al. | 280/743.1 |
| 3,874,694 | 4/1975 | Stephenson | 280/737 |
| 4,153,273 | 5/1979 | Risko | 280/740 |
| 5,161,821 | 11/1992 | Curtis | 280/730.2 |
| 5,251,931 | 10/1993 | Semchena et al. | 280/730.1 |
| 5,322,322 | 6/1994 | Bark et al. | 280/730.2 |
| 5,335,940 | 8/1994 | Cuevas | 280/737 |
| 5,393,091 | 2/1995 | Tanaka et al. | 280/733 |
| 5,454,586 | 10/1995 | Rogerson | 280/736 |
| 5,464,246 | 11/1995 | Castro et al. | 280/730.2 |
| 5,468,012 | 11/1995 | Mihm | 280/741 |
| 5,472,230 | 12/1995 | Every, Sr. et al. | 280/730.1 |
| 5,480,181 | 1/1996 | Bark et al. | 280/730.2 |
| 5,496,061 | 3/1996 | Brown | 280/730.2 |
| 5,499,840 | 3/1996 | Nakano | 280/730.1 |
| 5,533,750 | 7/1996 | Karlow et al. | 280/730.2 |
| 5,556,127 | 9/1996 | Hurford et al. | 280/730.2 |
| 5,570,900 | 11/1996 | Brown | 280/730.2 |

FOREIGN PATENT DOCUMENTS

| | | |
|---|---|---|
| 42 11 209 A1 | 10/1993 | Germany . |
| 4-100754 | 4/1992 | Japan ................. 280/743.1 |

*Primary Examiner*—Peter C. English

[57] ABSTRACT

A combination and a method for protecting an occupant in a vehicle in the event of a collision involving the vehicle. The combination has an inflatable bag for confining, when inflated, the disposition of the occupant in the vehicle, a container for holding pyrotechnic material, a housing having an inner surface, an interior volume and a seal for holding a gas at a first pressure, and opening at a second, higher pressure, wherein the gas is expansible when subjected to heat, an initiator for initiating the combustion of the pyrotechnic material upon the occurrence of a collision involving the vehicle, and a manifold, having a length, the manifold enveloping the housing and defining a passage with the housing. The manifold defines holes along the length of the manifold for introducing into the inflatable bag the gas flowing through the passage between the housing and the manifold. In addition, the first pressure is sufficiently high and the pyrotechnic material has a burning time that is sufficiently short, such that, upon combustion, the pyrotechnic material burns substantially completely and without substantial contact of burning material upon the inner surface as it leaves the container, such that the pressurized gas at the first pressure is heated, thereby increasing the gas pressure to at least the second pressure to cause the seal to open and the gas to exit the interior volume in a time sufficiently short to substantially prevent transfer of heat to the housing.

16 Claims, 6 Drawing Sheets

SIDE IMPACT AIR BAG SYSTEM

This is a continuation of application No. 08/664,973, filed Jun. 3, 1996, now abandoned.

BACKGROUND OF THE INVENTION

Safety of occupants in a vehicle is an important concern to manufacturers and occupants of the vehicles. The manufacturers have disposed seat belts, some partially or wholly inflatable, and inflatable air bags in the vehicles to protect the occupants when collisions involving the vehicle occur. An inflatable member (this term is used herein to include an air bag as) becomes inflated upon the occurrence of a collision involving a vehicle to reduce the occupant's velocity below unacceptable rates and to limit the occupant's movement to enhance the occupant's safety. Many manufacturers have started to provide inflatable members for occupants seated in a front seat.

Perhaps the most significant consideration in a vehicle containing an inflatable member relates to the fact that such a member cannot begin to restrain the occupant's motion during the vehicle collision until the occupant has moved into engagement with such member. Particularly in the case of side protecting air bags, which are typically deployed between the door and the occupant, only a short time is available between the impact and when the occupant begins to move.

The amount of the pyrotechnic material required in the inflators of the prior art have been roughly between fifty percent (50%) to one hundred percent (100%) more than the pyrotechnic material used in the inflator of this invention. As a result, acceptable packaging of the inflatable member and the inflator within a vehicle has been difficult in the prior art.

The configuration and composition of the combustible materials used in existing inflators have also produced relatively slow inflation systems. These slow inflation systems, while sometimes useful for frontal air bags, have not been useful for inflatable seat belts and side impact protection systems since such restraints have to deploy in less than one-fifth of the time for the deployment of a typical air bag. This has been necessitated by the fact that the inflatable belt and the inflatable side bag have to provide occupant protection in much less time than is available for frontal impact air bags. Furthermore, the deceleration distances involved in a side collision and the time interval between the initiation of the side impact against the vehicle and the striking of the occupant against an interior vehicle surface are greatly reduced relative to the distance and time for a front impact.

The combustible materials for some of these systems have also required filters to collect the solid particulates that are produced. The solid particulates required to be filtered in such prior art systems have been excessive. Other systems have been required to utilize relatively large pyrotechnic grains. These grains have been of such size that grain fracture and cracking have occurred and have caused variations in the combustion surface, thereby detrimentally affecting the burning rates within the grains and hence operating pressure and the inflation time.

Furthermore, when large grains have been utilized with slow burning rates, the variations in performance over the range of operating temperatures have been undesirably large. For example, assuming a 40–50 millisecond function time, the changes in the burning rate of the pyrotechnic material have caused the function time of the inflator to vary by approximately ±20% when the temperature has been varied between 175° F. and −65° F. This has resulted from changes in the burning rate of the pyrotechnic material with variations in the operating temperature. This considerable percentage change in the burning rate has produced a change in overall function time of approximately 15–20 milliseconds, an appreciable portion of the time available to an air bag to decelerate the movement of the occupant. This change in overall function has produced a resultant variation in occupant protection.

Collisions involving a vehicle at the side of the vehicle are potentially more dangerous than collisions involving a vehicle at the front of the vehicle. one reason is that the vehicle offers very little protection to the occupant when the collision occurs at the side of the vehicle. This results from the fact that only a thin sheet of material defining the side of the vehicle protects the occupant from a collision involving the side of the vehicle.

It has taken years for car manufacturers to accept that inflatable bags should be included in vehicles. The car manufacturers have concentrated on providing inflatable bags to protect the driver and sometimes the other occupant in the front seat from collisions involving the front of the vehicle. The car manufacturers have not concentrated nearly as much in providing an inflatable bag which will satisfactorily protect the driver and the other occupants against side collisions.

In co-pending application Ser. No. 08/587,773 filed on Dec. 22, 1995, for a "System Including an Inflatable Member and an Inflator for Protecting an Occupant in a Vehicle Upon a Collision Involving the Vehicle and Method of Inflating the Member" and assigned of record to the assignee of record of this application, I disclose and claim a system which overcomes the disadvantages and deficiencies discussed above, particularly for front end collisions. The construction and operation of the different sub-assemblies or components in the system of this invention are supplemented by my co-pending application Ser. No. 08/587,773 filed Dec. 22, 1995 which is incorporated in this application by reference.

Prior side air bags proposed have included the air bag arrangements of U.S. Pat. Nos. 5,496,061, 5,464,246, 5,322,322, and 5,282,648.

BRIEF DESCRIPTION OF THE INVENTION

This invention provides a system and method which overcome the disadvantages discussed above relating to the prior art. It includes an inflator which constitutes an improvement of the inflator disclosed and claimed in application Ser. No. 08/587,773 and which responds almost instantaneously to a collision involving the side of a vehicle to inflate a bag also included in the system. Since the inflator of this invention constitutes an improvement over the inflator disclosed and claimed in application Ser. No. 08/587,773, it has all of the advantages of the inflator disclosed and claimed in application Ser. No. 08/587,773.

The inflatable bag of this invention is disposed adjacent the side of an occupant's near the shell of the vehicle to protect the occupant when such a collision occurs. The relationship between the inflator of this invention and the bag of this invention is such that the time for inflating the bag is minimized by inflating the bag simultaneously along the length of the bag. The bag is disposed in a relationship against the side of the seat to occupy a minimal space, before inflation, in a compartment providing an aesthetic appearance and to become inflated almost instantaneously to a maximal size.

In one embodiment of the invention, the opposite ends of an inflatable bag are folded toward the bag center and the bag is spirally wound to fit in a compartment at the side of a vehicle seat in a vehicle. The compartment is severable to provide for the bag inflation when a collision involving the vehicle side occurs. The bag is clamped to a manifold extending along the bag length. A housing holding an expansible gas is disposed within the manifold along the manifold length and is pneumatically isolated from the manifold by a diaphragm. In another embodiment, the bag flaps are tucked in the bag and the bag is folded in a zig-zag manner.

A rupturable container holding particles of a pyrotechnic material is disposed in the tube. The pyrotechnic particles become ignited by electronic circuitry which has Faraday shielding and which becomes energized when a collision occurs against the vehicle side. Such combustion causes the container to become ruptured before the particle combustion is completed.

The partially combusted pyrotechnic particles then combust in the housing and transfer heat to the gas in the housing to expand the gas in the housing. This causes the diaphragm to break and to become impaled against a catcher, thereby providing for the gas flow through a passage defined by the housing and the manifold clear from debris.

The gas flows into the bag through holes at spaced positions in the manifold along the manifold length to inflate the bag. Successive holes may have progressively decreased spacings to provide for a substantially uniform inflation of the bag along the bag length. As the bag inflates, the bag becomes spirally unwound or unfolded and the folded opposite ends of the bag expand to increase the effective bag length.

The inflator and inflatable bag of this invention also provide other advantages in relation to the prior art. For example, the inflatable bag of this invention protects the neck and the head of an occupant in the vehicle from being subjected to violent motions as a result of a vehicular collision.

The air bag and the inflator of this invention also react so quickly that the occupant experiences a relatively small motion of the occupant's head and body before the bag becomes inflated. The distribution of the loads in the inflatable bag of this invention is over a wide area of the occupant's body and head, thus minimizing the load at any position on the occupant's body and head.

The elongation characteristics of inflatable bag are such that they contribute relatively little delay in the action of the bag in restraining the movements of the occupant's head and body. The inflator and inflatable bag of this invention are also easily stowed in the compartment, which occupies relatively little space and provides an aesthetic appearance.

Furthermore, the operations of the inflator and the inflatable bag are not adversely affected by changes in ambient temperature. The inflators of this invention are also relatively light in weight and do not require filters as in the prior art to collect particulates resulting from the combustion of pyrotechnic material in the inflator since no particulates are produced in the inflator of this invention.

DESCRIPTION OF THE PREFERRED EMBODIMENTS

Figure 1:
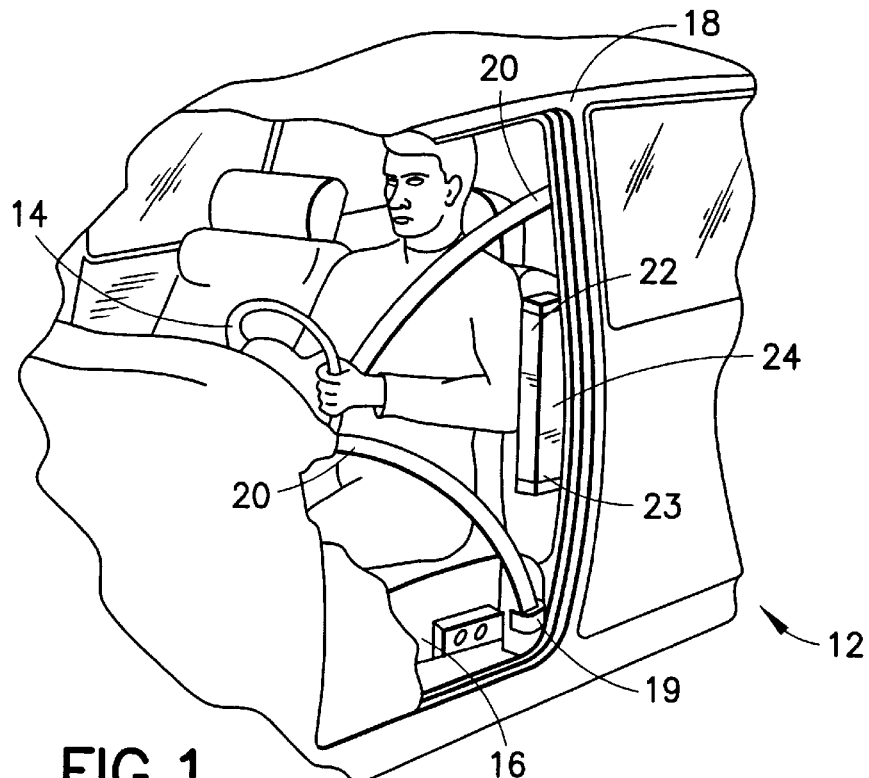
FIG. 1 is a fragmentary perspective view of a vehicle and shows a fragment of a front door, a seat, an occupant in the seat and a compartment at the outboard side of the seat for holding an inflatable bag.

In one embodiment of the invention, an inflatable bag generally indicated at 10 (FIGS. 2–4) is disposed in a vehicle generally indicated at 12 to become inflated when a collision involving the vehicle occurs. The vehicle includes a steering wheel 14 and a seat 16 to the rear of the steering wheel. An occupant is shown in the seat 16. A pillar 18 is provided at the rear of a framework for holding a door (not fully shown for purposes of clarity) for providing ingress to, and egress from, the vehicle 12. A belt 20 is shown as extending across the occupant's chest and across the occupant's lap to confine the disposition of the occupant in the seat 16. The steering wheel 14, the seat 16, the pillar 18, the framework 19 (not fully shown) and the belt 20 are conventional in motor vehicles.

A compartment 22 is shown in FIG. 1 as being attached as by adhesive 23 to the side of the seat 16 adjacent the framework 19. The adhesive 23 can be any suitable material well known in the prior art. For example, the adhesive 23 can be a suitable epoxy. The compartment 22 is closed before any collision involving the vehicle occurs. The compartment 22 has a flap 24 (FIG. 6) which is pivotable as at the rear end of the compartment 22 when a collision involving the vehicle 12 occurs. The inflatable bag 10 is disposed in the compartment 22 during the time that the bag is in the uninflated state.

Figure 6A:
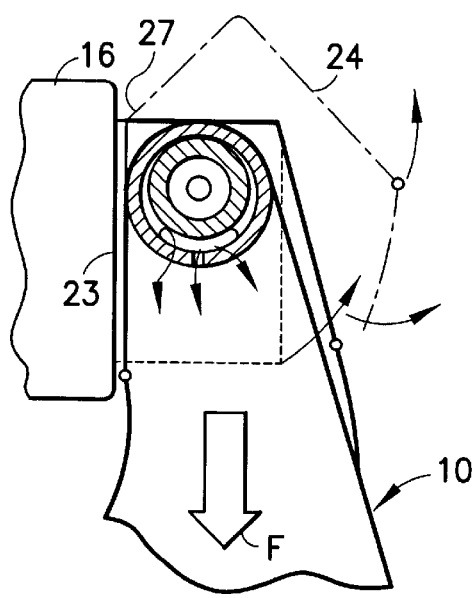
FIG. 6A is a fragmentary side view, similar to that shown in FIG. 6, of an alternative construction of the compartment to provide for an opening of the compartment to obtain an inflation of the bag.
Figure 6:
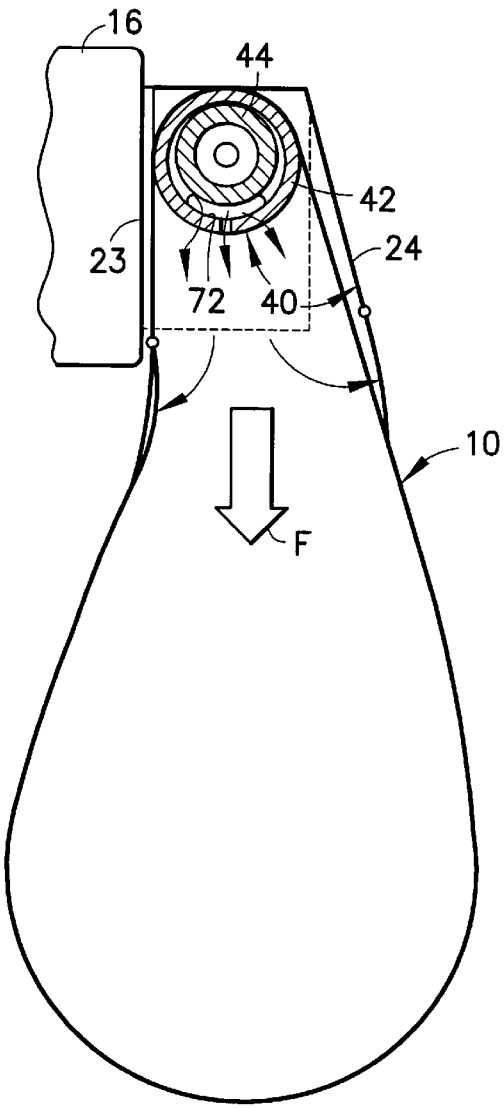
FIG. 6 is a side view, partially in section, showing the inflator and the bag after the bag has been inflated and also showing how the compartment becomes opened to provide for the inflation of the bag.

The pivoting of the flap 24 in FIG. 6 provides for an inflation of the bag 10 and a movement of the bag outside of the compartment 22 as the bag becomes inflated. Alternatively, the compartment 22 may be pivoted at the rear end 27 (FIG. 6A) to provide for a movement of the bag 10 outside of the compartment as the bag becomes inflated. It will be appreciated that the compartment 22 may become opened in other ways than the ways shown in FIGS. 6 and 6A to provide for an inflation of the bag 10.

It will be appreciated that the discussion above has been directed to an arrangement for protecting an occupant in the seat 16 which is shown as being adjacent the steering wheel 14. However, as will be seen from the subsequent discussion, the system and method of this invention are applicable to protect an occupant disposed in each of the seats in the vehicle 12. For each of these seats, a compartment corresponding to the compartment 22 is disposed on the outboard side of the vehicle between such seat and the shell of the vehicle and an inflatable bag corresponding to the inflatable bag 10 is disposed in such compartment. The compartment 22 and the other compartments may have an exterior appearance which is aesthetically compatible with the interior and the exterior of the vehicle 12 and may be placed within the seat upholstery fabric.

As shown in FIGS. 2, 3, 3A, 3B and 4, the inflatable bag 10 may have a body portion 26 and a pair of flaps 28 and 30 respectively extending integrally in upward and downward directions from the body portion. The inflatable bag 10 may be formed from a single sheet of material (FIG. 3A) made from a suitable material such as nylon having some elasticity. The single sheet of material may be symmetrical about a vertical axis 33 and may also be symmetrical about a particular horizontal axis 35. The single sheet of material may be folded on the particular vertical axis so that two (2) layers are formed on top of each other (FIG. 3B), each layer having the same configuration as the other layer. The two (2) layers are then sewn together at their peripheries as by stitches 32 to produce the bag 10.

The inflatable bag 10 may also have a root portion 34 which extends from the body portion 26. As will be seen in FIG. 3, the root portion 34 may be open at its one end in FIG. 3 to provide for the flow of a gas into the bag 10 to inflate the bag.

Figure 3:
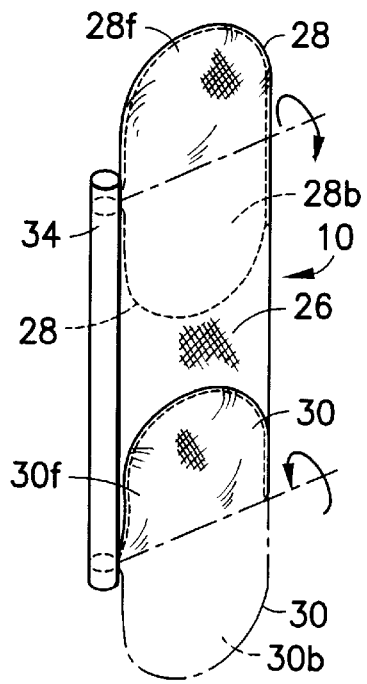
FIG. 3 is an enlarged perspective view of the bag before inflation and shows how vertically disposed flaps at the opposite ends of a central body portion in the bag are folded on the central body portion to dispose the bag within the compartment.
Figure 3A:
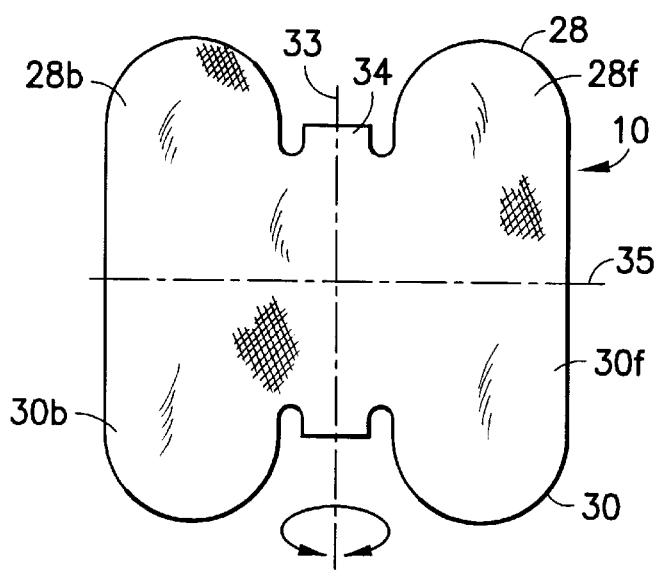
FIG. 3A is an enlarged elevational view of a fabric cut to form the inflatable bag shown in FIGS. 1 and 2.
Figure 3B:
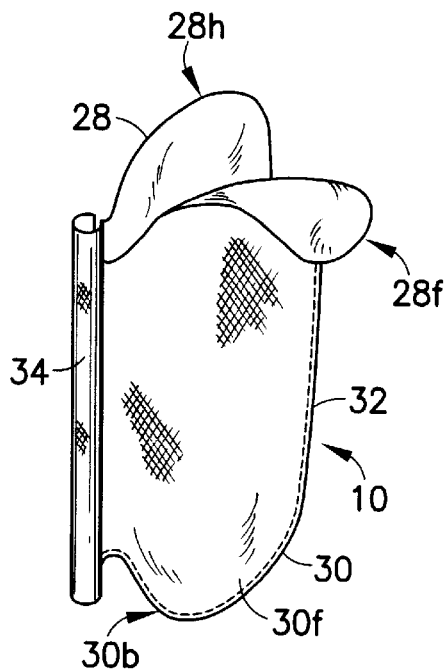
FIG. 3B is an enlarged perspective view of the fabric showing the almost complete stitching of the opposite horizontal portions of the fabric shown in FIG. 3A to form the bag shown in FIGS. 1 and 2.

The root portion 34 of the inflatable bag 10 may be suitably attached (FIGS. 3 and 4) to a body member 26 along the length of the body. The upper flap 28 is then folded downwardly on the body portion 26 from the position shown in solid lines in FIG. 3 at a position corresponding substantially to the upper extremity of the root portion 34. In like manner, the lower flap 30 is folded downwardly on the body portion 26 from a position corresponding substantially to the lower extremity of the root portion 34. As shown in FIG. 3, the flaps 28 and 30 do not overlap each other when folded on the body portion 26.

Figure 4:
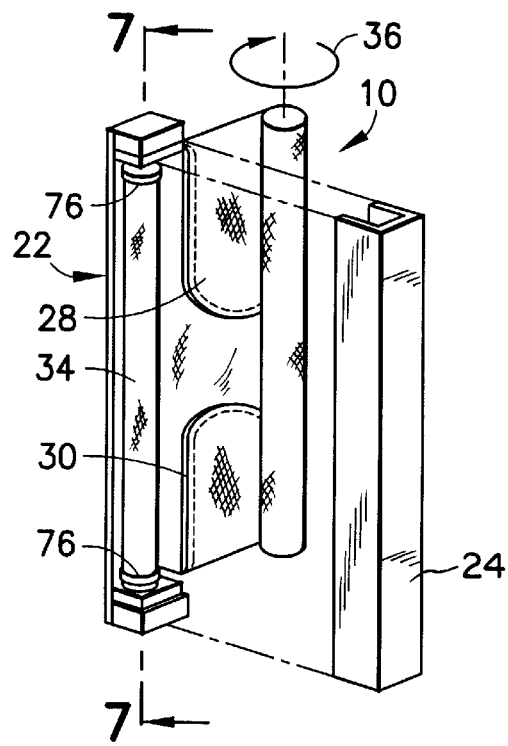
FIG. 4 is an enlarged perspective view of the bag similar to that shown in FIG. 3 and shows the bag and further shows how the bag is spirally wound to fit inside the compartment.

The bag 10 is then spirally wound on a vertical axis as shown in FIG. 4. The spiral winding of the bag 10 into a tight roll is indicated by an arrow 36 in FIG. 4. When the spiral winding of the bag 10 has been completed, the bag is disposed inside the compartment 22 and the flap 24 is pivoted to the closed position. In this way, the bag 10 is not seen by the driver and the passengers in the normal operation of the vehicle. This is advantageous because occupants of the vehicle may not wish to be constantly reminded that they may be involved in a collision involving the possibility of serious injuries. Furthermore, the disposition of the bag 10 in the compartment 22 and the provision of the compartment with an aesthetic appearance add to the decor of the vehicle 12.

The bag 10 becomes inflated when a collision involving the vehicle 12 occurs. As the bag 10 becomes inflated, the bag 10 becomes unwound from its tight spiral. As the bag 10 becomes unwound from its tight spiral, it forces the compartment flap 24 at the side of the compartment 22 to pivot to an open position as schematically shown in FIG. 6 so that the inflation of the bag can be completed outside of the compartment 22. When the unwinding of the bag 10 has been completed, the bag flaps 28 and 30 become respectively extended upwardly and downwardly from their folded disposition on the body portion 26 to positions effectively increasing the vertical height of the inflatable bag 10. In this way, the effectiveness of the bag 10 in protecting the occupant in the seat such as the seat 16 becomes enhanced.

Figure 2:
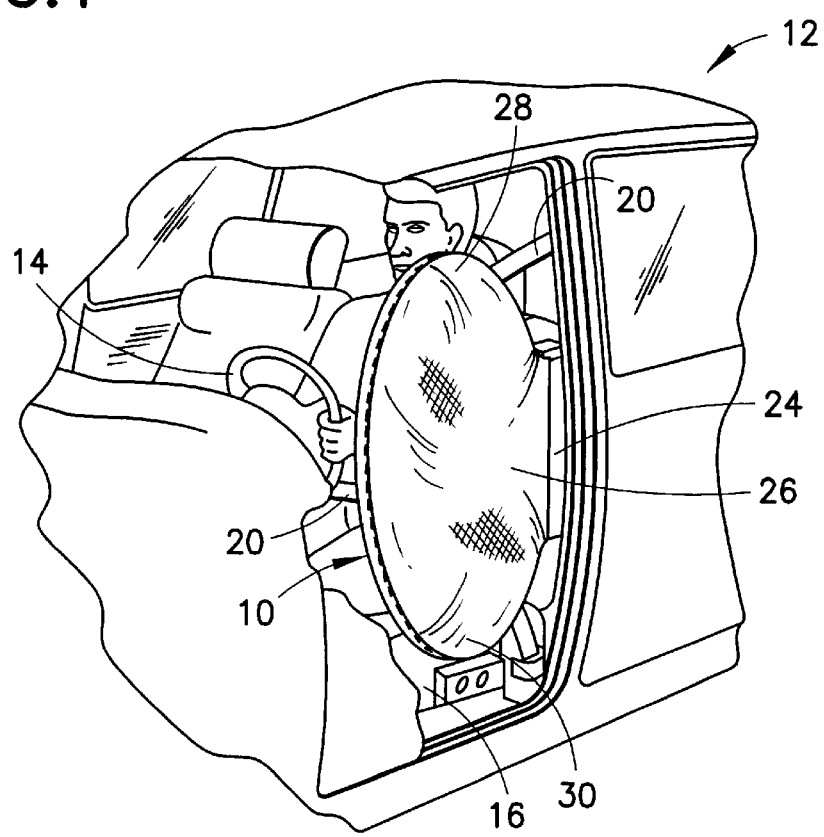
FIG. 2 is a fragmentary perspective view similar to that shown in FIG. 1 and shows the bag inflated to protect the occupant.

As will be seen in FIG. 2, the bag 10 when inflated occupies the space between the outboard side of the occupant's seat and the framework 19. (As the term "outboard" is used in the specification and in the claims, it refers to the space between the seat and the shell of the vehicle 12.) As a result, the bag 10 is especially effective in protecting the occupant from a collision involving the side of the vehicle 12. This is especially important because essentially only the thin sheet of metallic or plastic material forming the shell of the vehicle protects the occupant from the forces imposed upon the occupant as a result of such a collision.

Figure 9:
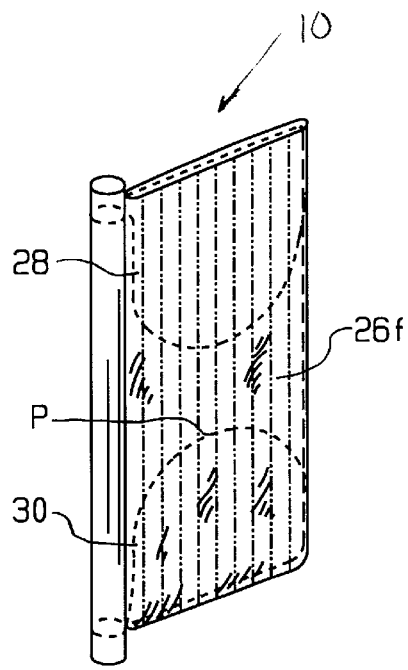
FIG. 9 is a perspective view of the bag with flap ends tucked into the bag rather than folded against the bag body.
Figure 9A:
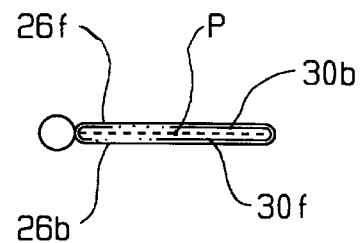
FIG. 9a is a bottom view of the bag of FIG. 9 with the bottom flap turned inside out and inserted (or tucked) between the sides of the bag body.
Figure 11:
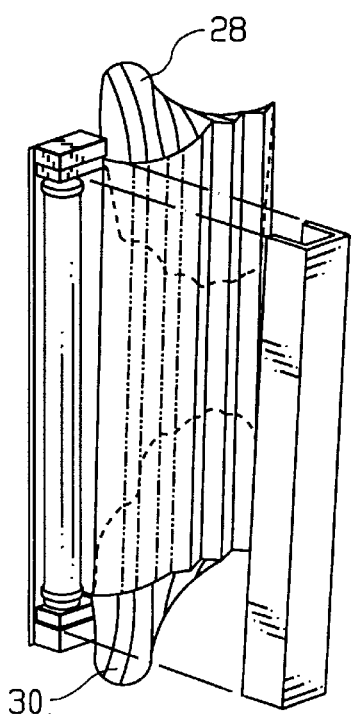
FIG. 11 shows the bag in its initial stage of inflation and deployment.
Figure 10:
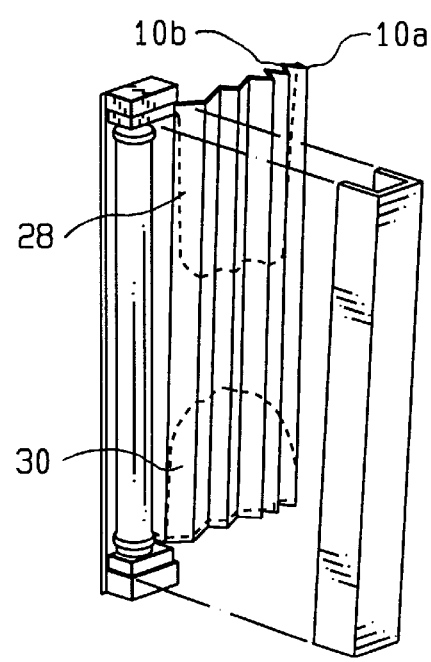
FIG. 10 is a view similar to FIG. 4 in which the bag is being folded in zig-zag fashion rather than being rolled.

Alternatively, bag 10 may be folded and deployed as shown in FIGS. 9–11. Bag flaps 28, 30 each of which have front and back sides 28$f$, 28$b$; 30$f$, 30$b$ respectively are turned inside out and inserted in the bag body 26 between bag body front and back sides 26$f$ and 26$b$. FIG. 9 shows flaps 28 and 30. FIG. 9$a$ is a bottom view of flap 30 tucked in between bag body walls 26$f$, 26$b$ forming a flap 30 pocket having its uppermost point at P. The uppermost point P of flap 30 is shown in FIGS. 9 and 9$a$ to further clarify that flap 30 is inside bag 10 prior to inflation.

Turning to FIG. 10 and 11, bag 10 is folded in zig-zag fashion by dividing bag 10 into vertical panel sections 10$a$, 10$b$, etc. By so folding bag 10, the deployment during gas filling is improved because flaps 28 and 30 can commence their emergence out of bag body 26 during gas filling (see FIG. 11) prior to complete deployment. A rolled bag with the flaps disposed outside the bag against the bag body sides does not, during unrolling, release flaps 28, 30 until unrolling is near completion (see FIG. 4).

The effectiveness of the bag 10 in protecting the occupant against injury may be considered to be at least as important as the effectiveness of the inflatable bags or the inflatable belts now included in vehicles to protect the occupant when a collision occurs at the front of the vehicle. Furthermore, the air bag 10 when inflated preferably extends from a position relatively close to the vehicle floor, but preferably not touching the vehicle floor, to a position adjacent the head of the occupant. This is schematically shown in FIG. 2.

An inflator generally indicated at 40 in FIGS. 5–8 extends along the length of the root portion 34 in the vertical direction to inflate the bag 10. As will be seen from the subsequent discussion, the inflator 10 is advantageous in that it inflates the bag 10 almost instantaneously. This is important, particularly when the bag 10 is used to protect the occupant against a collision involving the side of the vehicle 12, because the vehicle 12 offers very little protection against a collision. The inflator 40 produces this almost instantaneous inflation of the bag 10 partly because it inflates the bag 10 at the same time along the full length of the bag and partly because it has constructional and operative advantages which will be described in detail subsequently.

The inflator 40 includes a manifold 42 and a housing 44 disposed inside the manifold 42. The manifold 42 and the housing 44 may be formed from a metallic material preferably of a low thermal conductivity or from a material with an interior surface coating of a low thermal conductivity. The manifold 42 and the housing 44 have a thickness to withstand elevated gas pressures. The surface coatings may be formed from an epoxy, fiber glass, nylon or a number of other suitable materials having a low thermal conductivity, all of which materials are known in the art.

A suitable gas, preferably in the column designated as "inert" in the chemical table, is disposed inside the housing 44 under pressures in the 3000 to 4000 psi range. The gas may illustratively be nitrogen, helium or argon. All limit chemical reaction with particles of a pyrotechnic material 46 in a frangible container 77 or with any by-products or end products resulting from the combustion of such particles of the pyrotechnic material 46. The container 77 may be preferably made from a thin material having a low thermal conductivity. Container 77 has curved side walls 77s and end wall 77e which walls have variable thicknesses so that the side walls 77s and end wall 77e will burst at about the same time to provide a more uniform movement of burning particles of material 46 out of burst container 77. Any of the compositions specified above for the manifold 42 and the housing 44 would be satisfactory for the frangible container 77.

Argon is preferred as the gas in the housing 44 because it has a low thermal conductivity. As a result, a substantial portion of the heat generated by the combustion of the particles of the pyrotechnic material 46 is trapped raise the temperature of the molecules of the argon gas in the housing 44 and expand the gas in the housing in accordance with such temperature rises.

The combustible or pyrotechnic material 46 may constitute relatively small particles or granules with a size in the range of approximately 0.010 inches to approximately 0.060 inches. The particles may typically have physical dimensions approximately 0.050 inch in diameter and approximately 0.20 inch thick or physical dimensions which are roughly spherical and granular with a sixteen (16) mesh size.

The pyrotechnic material 46 may illustratively constitute particles of a material designated as UPCO 302 or UPCO 7019A by applicant's assignee of record in this application. The particles of the pyrotechnic material 46 may comprise a mixture of different sizes to control the time for the combustion of the combustible material. When used in the quantities required for the inflator 40, the pyrotechnic material 46 has properties of providing by-products when partially combusted, or end products when fully combusted, that are environmentally safe and that do not produce offensive or noxious smells when used in the small quantities associated with the inflator 40. The term "environmentally safe" as used herein is meant to indicate that the by-products and end products from the combustion of the pyrotechnic materials 46 do .not injure the occupant or damage the vehicle or the atmosphere.

The material designated as "UPCO 7019A" is particularly advantageous since it produces environmentally safe material when it combusts. The material designated as "UPCO 302" is advantageous because it generates a higher heat of combustion than the material "UPCO 7019A" but is disadvantageous in that it may generate some environmentally unsafe products such as carbon monoxide when it combusts. However, to counter this, a sufficient amount of oxygen can be included in the housing 44 to oxidize all of the carbon monoxide to carbon dioxide. Furthermore, an additional oxidizer can be included in the housing 44 to post combust with any excessive carbon monoxide combustion product of the UPCO 302 propellant.

Figure 7:
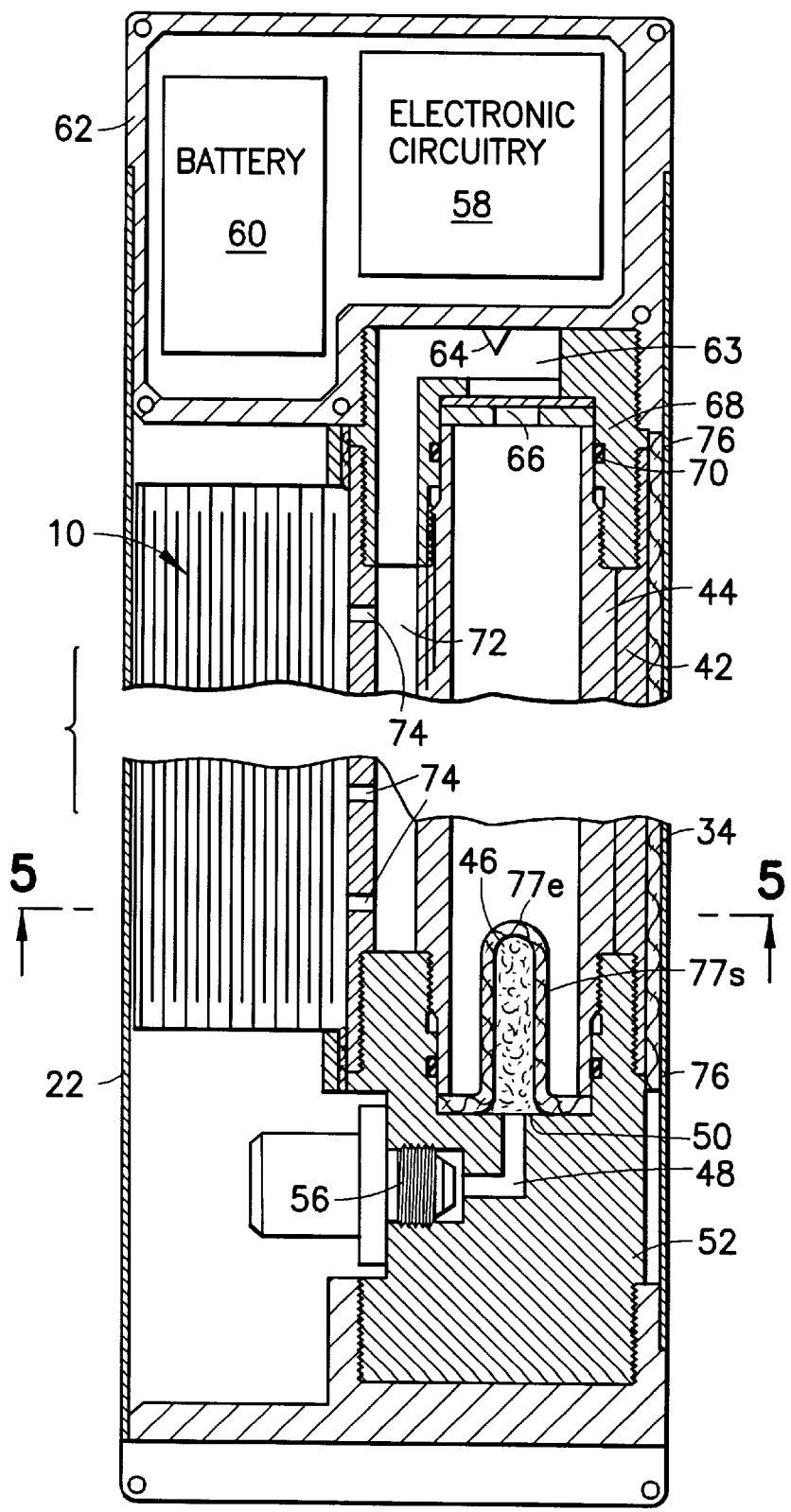
FIG. 7 is a sectional view taken along line 7—7 of FIG. 4.

A squib 56 is disposed in a socket in the fitting 52 in communication via passage 48 with the pyrotechnic material 46 in container 77. The construction of a suitable squib is known in the art. The passage 48 is separated from the housing 44 by a rupturable diaphragm 50 (FIG. 7).

Fitting 52 has threads in mesh with corresponding threads on the housing 44 and the manifold 42. An O-ring 54 may be disposed between the housing 44 and the fitting 52 to provide a seal between the housing and the fitting.

Figure 8:
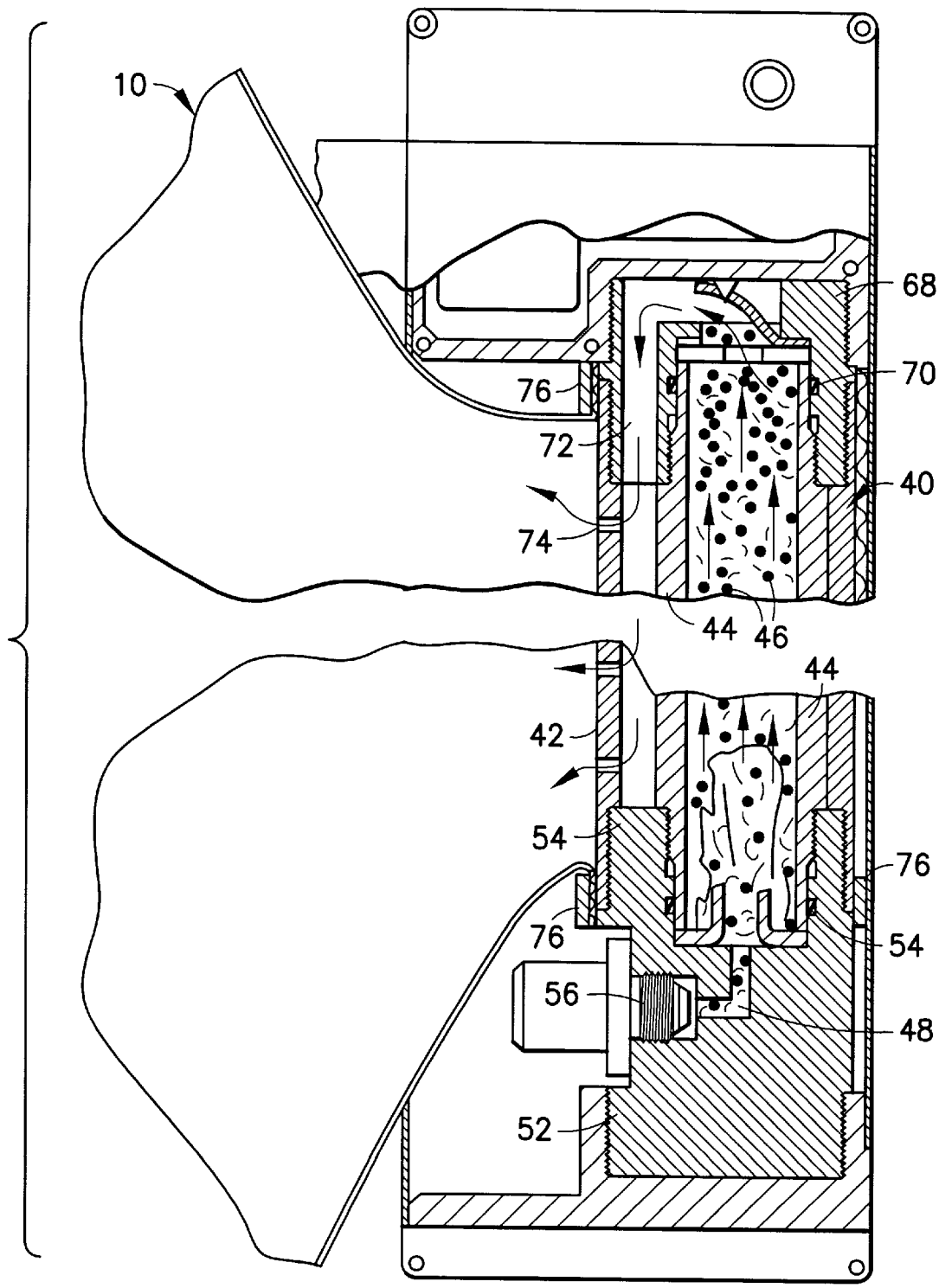
FIG. 8 is a partial sectional view along line 7—7 of FIG. 4 with the bag deployed.

The squib may be ignited by a signal from electronic circuitry 58 (FIG. 8). The electronic circuitry 58 may be constructed as shown and described in U.S. Pat. No. 5,335, 598 issued to me and Larry LaClair on Aug. 9, 1994 for "Timing and Firing Circuitry" and assigned of record to the assignee of record in this application. The electronic circuitry 58 may be energized by a battery 60. The specification and drawing in U.S. Pat. No. 5,335,598 are incorporated in this application if there is any question as to the construction and operation of such electronic circuitry.

The electronic circuitry 58 and the battery 60 may be disposed within outer housing 62 preferably made from a suitable material such as a metal to provide a Faraday shield for preventing the electronic circuitry from being energized by stray electromagnetic waves. The housing 62 is spaced from the housing 44 to define an end conduit 63 (FIG. 7). The housing 62 may preferably be thin and may preferably be made from a material of a low thermal heat conductivity such as those described above for the manifold 42 and the housing 44.

A catcher 64 is disposed on the external periphery of the housing 62 adjacent to, and preferably in line with, a rupturable diaphragm 66 on the housing 44. The catcher 64 is disposed and configured to impale the diaphragm 66 when the diaphragm ruptures. The catcher 64 is disposed in the end conduit 63. In this way, the conduit 63 does not become blocked when the diaphragm 66 becomes ruptured. It will be appreciated that other means than the diaphragm 66 may be used to isolate the housing 44 from the conduit 63 and to provide a communication between the housing and the conduit when the gas in the housing expands. For example, a spring-biased pop-off valve may be used instead of the diaphragm 66.

The housing 44, the manifold 42 and the housing 62 are fixedly positioned relative to each other as by an insert 68 which has threads in mesh with the housing 44, the manifold and the housing 62. An O-ring 70 is disposed between the tube 44 and the insert 68 to seal the tube relative to the insert. As will be seen in FIGS. 5, 6 and 8, the housing 44 is eccentric relative to the manifold 42 so as to be disposed in substantially abutting relationship with the manifold at one end and to define an elongated passage 72 with the manifold at the opposite end.

As will be seen in FIGS. 6–8, the passage 72 extends along substantially the full lengths of the manifold 42 and the housing 44. Holes 74 are provided in the manifold 42 at spaced positions along the length of the manifold. The holes 74 provide a communication between the passage 72 and the inflatable bag 10. Preferably, the distance between successive pairs of the holes 74 progressively decreases at progressive positions along the manifold as shown schematically in FIGS. 6–8. The bag 10 is clamped to the manifold 42 at its opposite ends as by rings 76.

When the vehicle 12 is involved in a collision, particularly in a collision against a side of the vehicle, the electronic circuitry 58 generates a signal which is introduced to the squib 56 to ignite the squib. The squib 56 in turn causes a surge of very hot materials to travel along passage 48 to ignite the pyrotechnic material 46 in the container 77. The heat generated by the combustion of the squib 56 causes the diaphragm 50 to open or rupture almost instantaneously and ignite the pyrotechnic material 46. Container 77 is not isolated from housing 44 in that the pressure in container 77 is the same as the pressure in housing 44.

The opening or rupture of the container 77 occurs after a relatively short period of time such as approximately one millisecond (1 ms). At the end of this time, the particle size of the pyrotechnic material 46 has been diminished somewhat by the partial combustion of the particles. After the rupture of the container 77, the partially combusted particles of the pyrotechnic material 46 pass into the housing 44 where such particles continue to combust. This combustion occurs for a relatively short period of time such as approximately two to five milliseconds (2–5 ms). The size and burning characteristics of material 46 are selected to accomplish combustion within these periods of time.

As shown schematically in FIG. 8, the particles of the pyrotechnic material 46 travel in a direction away from the passage 48 and all remains of container toward the diaphragm 66 and combust as they travel in this direction. This causes the particles of the pyrotechnic material 46 to diminish in size as they travel from ruptured container 77 along housing 44 toward the diaphragm 66. The progressive diminution in size of the particles of the pyrotechnic material 46, as the particles to move from the container 77 toward the diaphragm 66, is further shown in FIG. 8.

The composition of the particles of the pyrotechnic material 46 and the combustion of the particles of the pyrotechnic material at progressive positions in the housing 44 offer certain important advantages. The pyrotechnic material 46, and particularly the "UPCO 7019A" material, combusts to produce by-products and end products which are not injurious to the environment or to the occupant. This is also true of the "UPCO 302" material when additional amounts of oxygen or fuel are disposed in the housing 44.

Furthermore, the combustion of the particles of the pyrotechnic material 46 in the housing 44 causes the heat generated by such combustion to be transferred directly and thermally to the molecules of the gas in the housing 44 without substantial contact with the housing or other heat absorbing surfaces. The housing 44 and the container 77 present low thermal conductivity surfaces to interface with the heated gas, thereby causing the liberated heat from the combustion of the pyrotechnic material 46 to be utilized effectively only to heat and expand such gas. Furthermore, the container 77 and the housing 44 do not absorb any significant amount of the generated heat because they are relatively thin and because the inflator 40 does not contain any filters which would absorb a significant amount of the thermal energy from the gas as the gas passes through the filters.

As previously indicated, the gas in the housing 44 is preferably nitrogen, helium or argon. All limit chemical reaction between the pyrotechnic material 46, or any by-products products or end products resulting from the combustion of such pyrotechnic material, and such gas. Of the inert gas, argon is preferred because it has a low thermal conductivity and higher mass. As a result, a substantial portion of the heat generated by the combustion of the particles of the pyrotechnic material 46 is trapped within the molecules of the argon gas. This heat is used to raise the temperature of the molecules of the argon gas in the housing 44. It expands the argon gas in the housing 44 and increases the pressure of the argon gas against the diaphragm 66.

The container 77 and the housing 44 also co-operate in maximizing the temperature increase of the gas in the housing as a result of the heat generated by the particulate combustion. The internal surface coating of housing 44 and the container 77 are made from low thermal conductivity materials, at least on the surfaces in contact with the gas. Such materials may be ceramics, rubber coatings, polyethylene coatings and the like. These materials have thermal conductivities of approximately 1 to 15 K/W(M.K.) as compared to a range of conductivities from 50 to 200 K/W (M.K.) when a relatively high thermal conductivity material such as steel or aluminum is used for the housing 44 and the container 77.

The housing 44 and the container 77 also do not absorb any significant amount of the generated heat because they are exposed to high temperatures only for relatively short periods of time of approximately ten milliseconds (10 ms) or less. This is in contrast to existing inflators which function at such elevated temperatures for approximately thirty to sixty milliseconds (30–60 ms). During such relatively extended periods of time, heat is transferred to the members forming such inflators.

When the gas has expanded sufficiently in the housing 44, the diaphragm 66 breaks and the gas expands through the passage 72. The area of the diaphragm 66 and the cross sectional area of the passage 72 may be selected to control the time for the opening or rupture of the diaphragm 66 and the flow of the gas through the passage into the inflatable bag 10. Diaphragm 66 is constructed to break at pressures of about 12,000 psi. The particular composition of the pyrotechnic material 46 and the relative sizes of the different particles in such material also control the time within which the gas is to be heated within the housing 44. Such particular composition accordingly controls the time for the gas to flow .into the inflatable bag 10. Although the discussion in the specification is specifically directed to the inflatable bag 10, it will be appreciated that the inflator 40 may be used with other types of inflatable members than the inflatable bag 10.

The expansion of the gas in the housing 44 causes a force to be produced which ruptures the diaphragm 66. When the diaphragm 66 ruptures, the gas in the tube 44 flows through end conduit 63 and into passage 72. The conduit 63 remains open even after the rupture of the diaphragm 66 because the catcher 64 impales the diaphragm if the diaphragm should become detached from the housing 44.

As the gas flows through the passage 72, it passes through the holes 74 into the bag 10 to inflate the bag. As will be seen, the bag 10 becomes simultaneously inflated through the holes 74 along the full length of the bag. This minimizes the time for the inflation of the bag 10 and provides protection to the occupant in a minimal period of time along the full length of the bag.

The bag 10 may be inflated simultaneously at substantially the same rate along the full length of the bag by spacing the successive holes 74 progressively closer to one another along the full length of the bag. This compensates for the decrease in the pressure of the gas in the passage 72 at progressive positions along the bag 10 because of the flow of the gas through such holes at the progressive positions.

Figure 5:
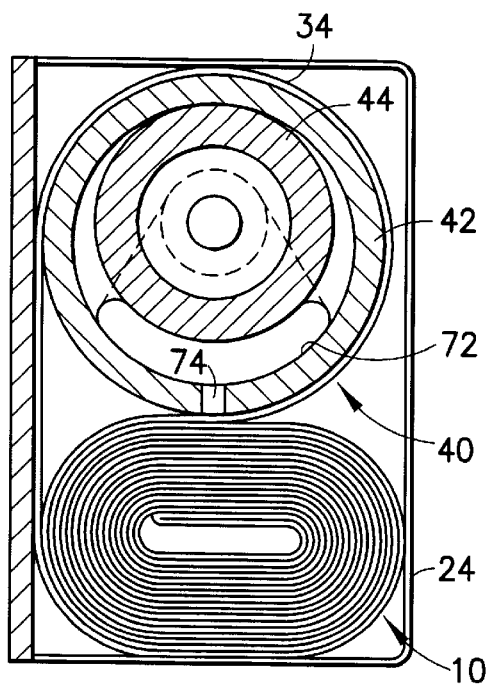
FIG. 5 is a sectional view taken substantially on the line 5—5 of FIG. 7 and shows the disposition of the bag and an inflator inside the compartment, the inflator being operative to inflate the bag upon the occurrence of a collision involving the side of the vehicle.

As the bag 10 becomes inflated, the bag becomes unwound from the spiral configuration shown in FIG. 5 and schematically shown in FIG. 4. As the bag 10 becomes unwound from the spiral configuration, its longitudinal dimension increases. This is the dimension along the length of the vehicle 12. When the bag 10 has become fully unwound from its spiral configuration, its longitudinal dimension has been significantly increased from that shown in FIG. 5. In its fully unwound relationship, the bag 10 extends across the full length of the occupant in the seated disposition. This may be seen from FIG. 2. The occupant's full body thus becomes fully protected against the impact of the collision as schematically shown in FIG. 2.

When the bag 10 has become fully unwound from its spiral configuration, the flaps 28 and 30 in the bag become lifted from the body portion 26. This provides for an extension of the bag 10 in the vertical direction. In this way, the bag 10 becomes extended vertically. While the bag is in the compartment 22, the height of the bag 10 is about sixteen inches (16"). After the bag 10 has become fully inflated, the height of the bag is about twenty six inches (26") because of the rotation of the flaps 28 and 30 from the body portion 26. This height is sufficient to protect the seated occupant from a position adjacent the occupant's hips to a position adjacent the occupant's head.

The inflation of the bag 10 controls the occupant's head motion by providing an inflated cushion which supports the occupant's head from rotating violently in a side direction. When the occupant's head rotates to the side, accompanied by a movement of the occupant's chest to the side, the occupant's head may impinge against the window or door or against the shell of the vehicle 12 if moving in a side direction unless adequate restraint is provided against this movement as in the system of this invention. Furthermore, the occupant's neck may be severely strained, as in the prior art of standard seat belts short or thorax only side bags, as a result of the violent jerk imparted to the neck at the time of the collision. The system of this invention protects against such injuries. It will be appreciated that the occupant's thorax region and hips are also protected by the inflatable bag 10 of this invention. When the occupant is sitting in a rear seat, the occupant's neck and head are protected in this manner by the inflatable bag 10 of this invention against moving against the side of the shell of the vehicle 12.

The inflation of the bag 12 occurs in a relatively short time from the instant of the collision in comparison to the inflation of the inflatable members such as the belts in the systems of the prior art. This results in part from the fact that the inflator 40 operates in a relatively short period of time such as approximately two (2) to five (5) milliseconds to initiate the flow of the gas such as argon through the passage 72. The time for the flow of the gas through the passage 72 into the inflatable bag 10 is also relatively short such as in the order of about ten milliseconds (10 ms) to fifteen milliseconds (15 ms). The total time for the inflation of the bag 10 is accordingly within the time available for producing the protective cushion between the body including the head and the interior of the side of the vehicle 12 in a collision against the side of the vehicle.

The amount of the pyrotechnic material 46 in the container 77 is so small and the inflation of the inflatable bag 10 is so fast that the temperature of the inflatable bag increases only a minimal amount. For example, the temperature rise of the inflatable bag 10 as a result of the inflation of such inflatable bag may be approximately less than 20° Fahrenheit. This prevents the occupant from being burned by the inflatable bag 10 such as sometimes occurs in the inflatable members of the prior art.

As will be seen, the inflatable bag 10 is advantageous because it can be retrofitted in a vehicle without having to adjust any of the components or sub-assemblies in the vehicle. The inflatable bag 10 can be provided for the occupant of the driver's seat, the occupant of the other front seat and the occupants in the rear seats. The inflatable bag 10 is provided as an integral assembly in each of these seats because the inflatable bag 10 can be disposed in the compartment 22 in an assembled relationship with the inflator 40 as shown in FIG. 5 and because the compartment 22 can be easily attached to the side of the occupant's seat as by the adhesive 23.

The system constituting this invention has certain important advantages in its individual sub-systems and in its assembled relationship. For example, the inflator 40 provides an almost instantaneous opening of the container 77 and the heating of the gas in the housing 44 because of certain advantages in the inflator. These advantages include the composition of the pyrotechnic material 46, the formation of the pyrotechnic material as particles, the partial combustion of the particles of the pyrotechnic material in the container 77 and the combustion thereafter of the particles of the pyrotechnic material in the housing 44 as such particles burn in juxtaposition in the housing to the gas with the low thermal conductivity. These advantages also include the minimal number of components in the inflator 40 and the thin walls of low thermal conductivity for the different components including the container 77, the housing 44, the manifold 42 and the housing 62.

Furthermore, since the pyrotechnic material 46 is in powder or granular form as distinguished from the larger grains used in some inflators in the prior art (20 times the size of the particles or grains of the pyrotechnic material of this invention), the combustion of the pyrotechnic material can occur in a time considerably shorter than in the prior art. This fast combustion of the pyrotechnic material 46 results in part from the small quantity of the pyrotechnic material in the container 77 and also in part from the relatively high pressure of about twelve thousand pounds per square inch (12,000) psi as compared to the prior art, at which combustion occurs. The inflator 40 of this invention also provides for substantially uniform operating characteristics in the inflatable bag 10 even with considerable changes in the ambient temperature in the vicinity of the vehicle.

The system and method constituting this invention also have other advantages over the prior art. For example, the housing 44 is disposed adjacent the conduit 63 and the passage 72. This helps to minimize the time for the inflatable bag 10 to become inflated. It also minimizes the inflator. The minimization in the weight of the inflator 40 and the space occupied by the inflator also minimizes the amount of the pyrotechnic material 46 in the inflator. As previously described, the pyrotechnic material 46 is preferably in particulate or granular form. The combustion of the pyrotechnic material 46 produces by-products and end products which do not require a filter to be included in the inflator.

The system and method described above have other important advantages. They include the inflator 40 and the inflatable bag 10, both of which can be included in the compartment 22 which is of such compact size that the compartment 22 can be adhered to the side of the seat 16 as by the adhesive 23. The compact size of the compartment 22 results in part from the spiral winding of the inflatable bag and the disposition of the flaps 28 and 30 on the body portion 26. Because of this, the compartment 22 can be retrofitted to the sides of all of the seats in vehicles which are now on the road.

Furthermore, the deposition of the flaps 28 and 30 on the body portion 26 in the compartment 22 allows the compartment to be of a relatively small size. For example, as shown in FIG. 1, the compartment 22 has a height less than the height of the seat 16.

The compartment 22 can have only a limited height, particularly if the compartment is to be raised from the floor of the vehicle 12 and is to be disposed against the seat 16 only along the height of the seat. The height of the bag 10 when inflated can be extended by disposing the flaps 28 and 30 from the opposite ends of the body portion 26. By providing the flaps 28 and 30, the bag 10 when inflated protects the occupant in the seated position from the occupant's legs to the occupant's head.

The system and method of this invention have other significant advantages. For example, the manifold 42 and the housing 44 define the passage 72, which may be of an extended length. The gas flowing through the passage 72 is introduced simultaneously into the inflatable bag 10 along the full height of the inflatable bag because of the disposition of the holes 74 in the manifold 42 along the length of the passage 72. The inflation of the inflatable bag 10 substantially uniformly along the length of the passage 72 can be facilitated by disposing the holes 74 progressively closer together along the length of the passage.

The inflatable bag 10 has characteristics which do not vary appreciably with changes in ambient temperature over a range of temperature variations between approximately −65° F. and +1750 F. This has resulted in part from the fact that the burning time of the particles of the pyrotechnic material 46 in the inflator 40 is in the order of only 2–5 milliseconds. It has also resulted in part from the fact that the passage 72 is adjacent the housing 44. This has caused the system of this invention to provide a more consistent performance and a significantly greater protection of the occupant than the systems of the prior art.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

What is claimed is:

1. A combination for protecting an occupant in a vehicle in the event of a collision involving the vehicle, the combination comprising:
   an inflatable bag for confining, when inflated, the disposition of the occupant in the vehicle,
   a container for holding pyrotechnic material, a housing having an inner surface, an interior volume and a seal for holding a gas at a first pressure, and opening at a second, higher pressure, wherein the gas is expansible when subjected to heat,
   an initiator for initiating the combustion of the pyrotechnic material upon the occurrence of a collision involving the vehicle,
   a manifold, having a length, the manifold enveloping the housing and defining a passage with the housing, and
   the manifold defining holes along the length of the manifold for introducing into the inflatable bag the gas flowing through the passage between the housing and the manifold, wherein
   the first pressure is sufficiently high and the pyrotechnic material has a burning time which is sufficiently short such that, upon combustion, the pyrotechnic material burns substantially completely and without substantial contact of burning material upon the inner surface as it leaves the container, such that the pressurized gas at the first pressure is heated, thereby increasing the gas pressure to at least the second pressure to cause the seal to open and the gas to exit the interior volume in a time sufficiently short to substantially prevent transfer of heat to the housing.

2. The combination as set forth in claim 1, further comprising at least one clamp for clamping the inflatable bag to the manifold.

3. The combination as set forth in claim 1, further comprising a seat in the vehicle, wherein the inflatable bag is disposed relative to the seat, such that, when inflated, the occupant is protected against a collision involving the side of the vehicle.

4. The combination as set forth in claim 1, wherein the pyrotechnic material is in the form of particles, and
   the container is configured and adapted to open to the housing upon partial combustion of the particles of the pyrotechnic material to obtain the disposition thereafter of the partially combusted particles of the pyrotechnic material in the housing and the combustion of such partially combusted particles of the pyrotechnic material in the housing.

5. The combination as set forth in claim 4, further comprising a seat in the vehicle, and
   at least one clamp for clamping the inflatable bag to the manifold, wherein the inflatable bag is disposed relative to the seat to protect, when inflated, the occupant against a collision involving the side of the vehicle.

6. The combination as set forth in claim 1, wherein the holes in the manifold are spaced at progressively reduced distances along the length of the passage to provide for a substantially uniform inflation of the inflatable bag along the length of the passage.

7. The combination as set forth in claim 1, wherein the container is configured and adapted to open to the housing upon the combustion of the pyrotechnic material, but before completion of the combustion of the pyrotechnic material to provide for the completion of the combustion of the pyrotechnic material within the housing.

8. The combination as set forth in claim 7, wherein the pyrotechnic material produces environmentally safe by-products and end products when combusted.

9. The combination as set forth in claim 1, further comprising at least one clamp for clamping the inflatable bag on the manifold.

10. The combination as set forth in claim 9, wherein the holes in the manifold, are at progressive positions along the passage, in communication with the interior of the inflatable bag for passing into the inflatable bag the gas flowing from the bag,
   the holes being spaced at progressively reduced distances along the length of the passage to provide for a substantially uniform inflation of the inflatable bag along the length of the passage,
   the container being opened to the housing upon the initiation of the combustion, but before the completion of the combustion of the pyrotechnic material to provide for the completion of the combustion of the pyrotechnic material within the housing, and the pyrotechnic material, upon combustion, produces environmentally safe by-products and end products.

11. A method of protecting an occupant in a vehicle in the event of a collision involving the vehicle, the method comprising:

providing a gas at a first pressure in a housing having an inner surface, an interior volume and a seal, configured and adapted to maintain the gas at the first pressure, and opening at a second higher pressure, disposing the housing in a manifold to define a passage between the housing and the manifold, isolating the housing from the manifold with the seal, providing a pyrotechnic material within the housing to heat the gas, causing the expansion of the gas in the housing upon the occurrence of a collision involving the vehicle to discontinue the isolation through such seal between the housing and manifold and to provide for the flow of the expanded gas thereafter through the passage, and disposing an inflatable bag relative to the passage to provide for the inflation of the bag by the expanded gas flowing through the passage, wherein the first pressure is sufficiently high and the pyrotechnic material has a burning time that is sufficiently short such that, upon combustion, the pyrotechnic material burns substantially completely and without substantial contact of burning material upon the inner surface, such that the pressurized gas at the first pressure is heated, thereby increasing the gas pressure to at least the second pressure to cause the seal to open and the gas to exit the interior volume in a time sufficiently short to substantially prevent transfer of heat to the housing.

12. The method as set forth in claim 11, further comprising the steps of:

disposing the inflatable bag in a closed compartment before the inflation of the bag, and opening the compartment upon the initiation of the inflation of the bag in the compartment to provide for an expansion of the bag outside of the compartment.

13. The method as set forth in claim 11, further comprising the steps of:

winding the inflatable bag in a spiral configuration for storage before the inflation of the bag, disposing the spirally wound inflatable bag in a closed compartment configured and adapted to open upon inflation of the inflatable bag, and opening the compartment during the inflation of the bag in the compartment to provide for an expansion of the bag outside of the compartment and an unwinding of the bag from the spiral configuration in accordance with the inflation of the bag.

14. The method as set forth in claim 11, further comprising the steps of folding panels of the inflatable bag in a folded zig-zag configuration for storage before the inflation of the bag, disposing the folded inflatable bag in a closed compartment configured and adapted to open upon inflation of the inflatable bag, and opening the compartment during the inflation of the bag in the compartment to provide for an expansion of the bag outside of the compartment and an unfolding of the bag from the folded configuration in accordance with the inflation of the bag.

15. The method as set forth in claim 11, further comprising the steps of:

providing the inflatable bag with a body portion and at least one flap extending from the body portion, inserting the flap into the body portion, and folding the body portion in a folded configuration for storage before the inflation of the bag, disposing the folded inflatable bag adjacent an occupant's seat, and inflating the bag upon the occurrence of a collision involving the vehicle, thereby unfolding the bag from the folded configuration, and unfolding the flap from the body portion upon the unfolding of the bag from the folded configuration.

16. The method as set forth in claim 15, further comprising the steps of:

providing an inflator to expand the gas upon the occurrence of a collision involving the vehicle, and disposing the inflator and the folded inflatable bag in a compartment configured and adapted to open upon initiation of the inflation of the bag, and attaching the compartment to the side of a seat in the vehicle.

* * * * *